US011733988B2

(12) United States Patent
Yoo et al.

(10) Patent No.: US 11,733,988 B2
(45) Date of Patent: Aug. 22, 2023

(54) APPLICATION DEPLOYMENT FOR APPLICATIONS OFFERED BY MULTIPLE DEPLOYMENT SOURCES

(71) Applicant: MICROSOFT TECHNOLOGY LICENSING, LLC, Redmond, WA (US)

(72) Inventors: Jeremy Tae Yoo, Issaquah, WA (US); Jose Julian Argil Torres, Sammamish, WA (US); David Moreno, Seattle, WA (US); Yeison David Garcia Gomez, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/153,506

(22) Filed: Jan. 20, 2021

(65) Prior Publication Data

US 2022/0229645 A1    Jul. 21, 2022

(51) Int. Cl.
| | | |
|---|---|---|
| *H04L 29/08* | (2006.01) | |
| *G06F 8/61* | (2018.01) | |
| *G06F 9/451* | (2018.01) | |
| *G06F 3/04845* | (2022.01) | |
| *G06F 9/445* | (2018.01) | |
| *H04L 67/10* | (2022.01) | |

(52) U.S. Cl.
CPC ............ *G06F 8/61* (2013.01); *G06F 3/04845* (2013.01); *G06F 9/445* (2013.01); *G06F 9/451* (2018.02); *H04L 67/10* (2013.01)

(58) Field of Classification Search
CPC ............... G06F 8/60; G06F 8/61; G06F 9/451
See application file for complete search history.

(56) References Cited

U.S. PATENT DOCUMENTS

| | | | | |
|---|---|---|---|---|
| 7,644,145 | B2* | 1/2010 | Rockwell | H04L 67/10 709/224 |
| 2007/0240160 | A1* | 10/2007 | Paterson-Jones | G06F 9/5055 718/104 |
| 2014/0108451 | A1 | 4/2014 | Lee et al. | |
| 2017/0279692 | A1* | 9/2017 | Llagostera | G06F 8/60 |
| 2018/0084038 | A1* | 3/2018 | Johnson | H04L 67/1021 |

(Continued)

OTHER PUBLICATIONS

"International Search Report and Written Opinion Issued in PCT Application No. PCT/US21/062722", dated Mar. 23, 2022, 14 Pages.

(Continued)

*Primary Examiner* — Lewis A Bullock, Jr.
*Assistant Examiner* — Mohammad H Kabir
(74) *Attorney, Agent, or Firm* — NovoTechIP International PLLC (57) ABSTRACT

A method and system for deploying an application from a deployment source to a device may include determining if the application is available for deployment to the device from a plurality of deployment sources, upon determining that the application is available for deployment from the plurality of deployment sources, identifying one of the plurality of deployment sources as a preferred deployment source for deploying the application; and deploying the application from the preferred deployment source to the device. Deploying the application may include installing the application, loading one or more user interface elements associated with the application and activating the application.

15 Claims, 4 Drawing Sheets

(56) References Cited

U.S. PATENT DOCUMENTS

2018/0084080 A1* 3/2018 Bajaj ................. H04L 67/535
2018/0349131 A1  12/2018 Mitra et al.

OTHER PUBLICATIONS

Samuel, et al., "Office Add-Ins Platform Overview", Retrieved from: https://web.archive.org/web/20201112035701/https://docs.microsoft.com/en-us/office/dev/add-ins/overview/office-add-ins, Oct. 14, 2020, 8 Pages.

* cited by examiner

APPLICATION DEPLOYMENT FOR APPLICATIONS OFFERED BY MULTIPLE DEPLOYMENT SOURCES

TECHNICAL FIELD

This disclosure relates generally to deployment of applications, and, more particularly, to a method of and system for selecting which deployment source to deploy an application from and to seamlessly changing deployment sources of applications that are available from multiple deployment sources.

BACKGROUND

A large number of applications and supplemental software programs used by users of computing devices are offered and available for deployment from multiple deployment sources. For example, many supplemental software programs (e.g., add-ins) are offered by multiple application stores. In an example, some supplemental software programs are available on both consumer application stores and enterprise application stores.

Although the applications offered by the different sources may be the same, because of the difference in source, the applications are often considered different by current computing systems. As a result, the same application may be deployed from multiple sources in one device, leading to both user confusion and unnecessary use of computing resources (e.g., storage, processing, and bandwidth resources).

Furthermore, some enterprises require their users to utilize specific deployment sources. For example, certain enterprises may require the use of a centralized deployment source. For such enterprises, when a consumer tries to use their personal device in the enterprise setting or attempts to utilize their enterprise device outside of the enterprise setting, the user may be forced to deploy an application they previously used from a different source. This may require the user to reinstall the application and may lead to loss of existing settings and data.

Hence, there is a need for systems and methods of efficiently and seamlessly transitioning between different deployment sources.

SUMMARY

In one general aspect, the instant disclosure describes a device having a processor and a memory in communication with the processor wherein the memory stores executable instructions that, when executed by the processor, cause the device to perform multiple functions. The functions may include determining if an application is available for deployment to the device from a plurality of deployment sources, upon determining that the application is available for deployment from the plurality of deployment sources, identifying one of the plurality of deployment sources as a preferred deployment source for deploying the application, and deploying the application from the preferred deployment source to the device, wherein deploying the application includes at least one of installing the application, loading one or more user interface elements associated with the application and activating the application.

In yet another general aspect, the instant disclosure describes a method for deploying an application from a deployment source to a device. The method may include determining if the application is available for deployment to the device from a plurality of deployment sources, upon determining that the application is available for deployment from the plurality of deployment sources, identifying one of the plurality of deployment sources as a preferred deployment source for deploying the application, and deploying the application from the preferred deployment source to the device, wherein deploying the application includes at least one of installing the application, loading one or more user interface elements associated with the application and activating the application.

In a further general aspect, the instant disclosure describes a non-transitory computer readable medium on which are stored instructions that when executed cause a programmable device to determining if an application is available for deployment to the device from a plurality of deployment sources, upon determining that the application is available for deployment from the plurality of deployment sources, identifying one of the plurality of deployment sources as a preferred deployment source for deploying the application, and deploying the application from the preferred deployment source to the device, wherein deploying the application includes at least one of installing the application, loading one or more user interface elements associated with the application and activating the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Applications and supplemental software programs offered by different deployment sources are often considered distinct from each other, even if they are the exact same application and/or supplemental software program. This is because applications are often identified by an application ID plus a deployment source ID. As a result, an application offered by multiple application stores may be loaded to a computing device from two different application stores and the two copies of the application may be treated as distinct applications. This may lead to having duplicate applications on one device and as such user confusion.

Furthermore, when certain restrictions are imposed on use of deployment sources, the users may have to transition from one deployment source to another. Because the same application offered by a different deployment source may be considered a different application, the user may have to reinstall some of their applications, reenter existing settings and/or save existing data. This often occurs in enterprise settings when the enterprise requires the users to transition from use of consumer application stores (e.g., Microsoft® Store) to enterprise application stores (e.g., Centralized deployment). It may also occur when the user attempts to use their personal device in the enterprise setting or vice versa. Furthermore, problems may surface when sharing documents that include supplemental software programs (e.g., Microsoft® add-ins) installed from a deployment source that is not available to the user with whom the document is shared. In such situations, currently installed applications and/or supplemental software programs (e.g., Microsoft® add-ins) may need to be reinstalled to function properly. This is not only time-consuming, but also leads to inefficient use of computing resources such as memory, processing, and bandwidth. As such, there exists a technical problem of providing efficient and seamless access to applications offered from multiple deployment sources.

To address these technical problems and more, in an example, this description provides a technical solution for deploying an application and/or supplemental software programs offered from multiple deployment sources from a preferred deployment source. To do so, techniques may be used to determine at runtime if an application is available from multiple available deployment sources, and upon determining that the application is offered by multiple deployment sources, identify a preferred deployment source for deploying the application from based on one or more predetermined rules and/or parameters. Furthermore, techniques may be employed to transition between different deployment sources of an application, when needed, in a manner that makes the deployment source seamless to the end user. As a result, even if the deployment source changes from an application, the user will not notice a difference. Furthermore, this eliminates the potential for multiple deployments of the same application, and as such reduces duplicated programs on the user's device. This significantly enhances the process of transitioning from one deployment source to another.

As will be understood by persons of skill in the art upon reading this disclosure, benefits and advantages provided by such implementations can include, but are not limited to, a technical solution to the technical problem of inefficient, confusing and resource intensive deployment of applications offered from multiple deployment sources. The technical solutions may enable seamless transition between different deployment sources without the need to reinstall and/or reenter settings and/or data into an application offered by multiple deployment sources. Furthermore, the technical solutions provide a mechanism for decreasing the possibility of having duplicated applications on a device, thus reducing use of memory and processing resources and as such improving the operation of computing devices. This reduces user confusion and inefficiency thus resulting in improved customer satisfaction. The benefits provided by these technology-based solutions yield more user-friendly mechanisms for providing access to applications offered by multiple deployment sources and for enabling enterprises to provide an efficient and smooth transition to use of enterprise deployment sources.

As used herein, the term "application" may refer to any software program that is available for retrieval from a deployment source and/or installation on a computing device. As such, the term "application" may include stand-alone software programs as well as supplemental software programs that work with and/or expand the capabilities of other software programs (e.g., Microsoft® add-ins). Furthermore, as used herein, "deployment source" may refer to any source from which an application may be deployed and may include reference to application stores.

Figure 1:
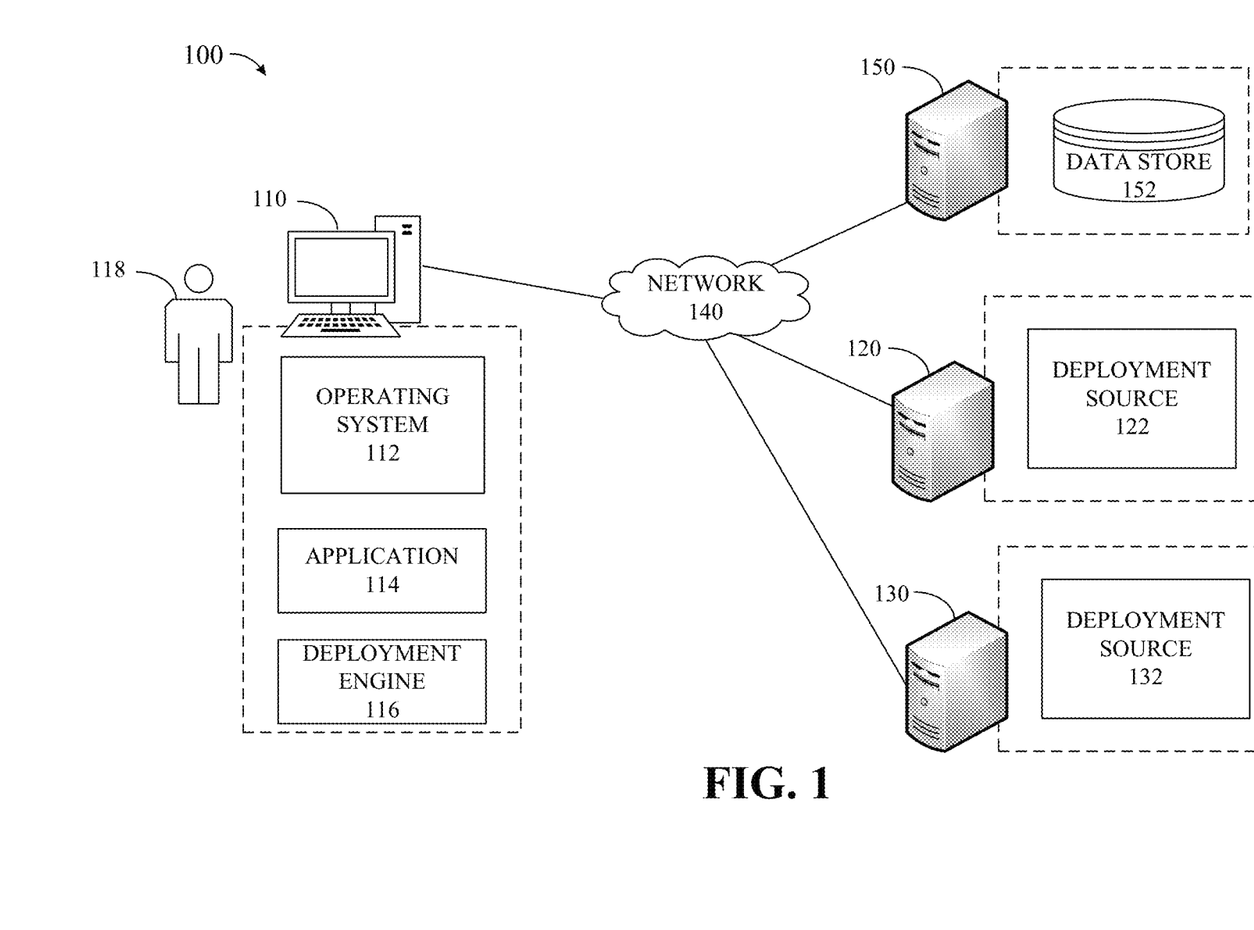
FIG. 1 depicts an example of a system upon which aspects of this disclosure may be implemented.

FIG. 1 illustrates an example system 100, upon which aspects of this disclosure may be implemented. The system 100 may include a plurality of deployment servers such as deployment servers 120 and 130. Each of the deployment servers may include a distinct deployment source such as the deployment source 122 of deployment server 120 and the deployment source 132 of deployment server 130. Each of the servers 120 and 130 may operate as a shared resource server accessible by various computer client devices such as client device 110. The servers may also operate as a cloud-based server for deployment services. Although shown as one server, each of the servers 120 and 130 may represent multiple servers for performing various different operations.

The deployment sources 122 and 132 may operate as distinct deployment sources for deployment of various applications. In an example, the deployment sources 122 and 132 may operate as application stores (e.g., third party application stores, consumer application stores or centralized deployment application stores) to which a user 118 has access via the client device 110. As such, each deployment source 122 and 132 include mechanisms for enabling a user to browse through or search for different applications, selecting a desired application and deploying the selected application to their devices. In some implementations, each deployment source 122 and 132 may provide access to a store catalog containing a list of applications available for installation from each deployment source. Deployment may include retrieval of executable code for installation of the selected application or loading of a selected supplemental software program to the client device 110 for use with an existing application. In some implementations, the deployment process may also include loading one or more user interface elements (e.g., icons representing the application or add-in) on user interface screens (e.g., on a ribbon, as a shortcut, and the like), and activating the application or add-in.

To enable retrieval of the selected application, the deployment sources 122 and 132 may be in communication with (e.g., via a network 140) or may include a storage server 150 containing a data store 152. The data store 152 may function as a repository in which one or more data sets containing application data (e.g., application information and/or code) for applications available via the deployment sources 122 and/or 132 are stored. In one implementation, application data for some of the applications may be stored and/or provided via other sources (e.g., storage servers associated with providers of the applications). It should be noted that although only one storage server is shown, a plurality of storage servers may be utilized. For example, each of the store deployment sources 122 and 132 may be associated with and use distinct storage servers.

The client device 110 may be connected to the deployment servers 120 and 130 via the network 140. The network 140 may be a wired or wireless network(s) or a combination of wired and wireless networks that connect one or more elements of the system 100. The client device 110 may be a personal or handheld computing device having or being connected to input/output elements that enable the user 118 to interact with content such as different applications and/or deployment sources. Examples of suitable client devices 110 include, but are not limited to, personal computers, desktop computers, laptop computers, mobile telephones; smart phones; tablets; phablets; smart watches; wearable computers; gaming devices/computers; televisions; head-mounted display devices and the like. The internal hardware structure of a client device is discussed in greater detail in regard to FIGS. 3 and 4.

The client device 110 may include an operating system 112 and a deployment engine 116. The operating system 112 may include one or more computer programs executed on the client device 110 that process, manage, and enable operation of one or more applications such as the application 114. In an example, the operating system 112 may be a Microsoft Windows® operating system. Among other features, the graphical operating system 112 may configure the client device 110 to be responsive to user input. User input may include input received via an input element such as a keyboard or a pointing device (e.g., a mouse) that enables the user 118 to interactively access different applications, select different deployment sources, and/or choose application(s) provided by a deployment source for deployment. For example, the user may utilize a pointing device to move a pointer over an icon on the screen to invoke display of an application store. The client device 110 may then communicate with the deployment source (e.g., deployment server 120 or 130) associated with the application store to enable display of and provide access to applications offered for deployment via the selected application store.

Once an application such as application 114 has been selected and deployed to the client device 110, the application may be used and operated on the client device 110 until a transition to a different deployment source may become necessary. For example, if the application 114 was deployed from the deployment source 122 and new restrictions placed on the device 110 require the device 110 to primarily utilize the deployment source 132, a transition to the new deployment source may be needed. In an example, this may occur, when an enterprise begins using an enterprise preferred deployment source and requires its users to switch to the preferred deployment source. The transition may also be needed when a user tries to use their personal device on which one or more applications have been deployed to an enterprise setting requiring the exclusive use of a preferred deployment source.

In such situations, the operating system 112 may operate alongside a deployment engine 116 to enable a seamless transition between the two distinct deployment sources. To achieve this, the deployment engine may determine if an application being loaded or accessed is available via multiple deployment sources and if so whether there is a preferred deployment source associated with the client device 110. When it is determined that multiple deployment sources exist for the application and the existing application (e.g., application 114) was deployed from the preferred deployment source, the deployment engine 116 may operate with the operating system 112 to communicate with the preferred deployment source to retrieve the application from the preferred source and/or remove or ignore the old version of the application. The deployment engine may perform this process such that existing settings and/or data used with the current application remain the same after deployment from the preferred deployment source. For example, when a document containing a supplemental software program (e.g., add-in) which was acquired from a consumer deployment source is opened, and restrictions on the client device give preference to the enterprise deployment source, the document will automatically transition to utilizing the same supplemental software program but one deployed from the enterprise deployment source, while persevering all existing consent and other settings. In another example, when a user who utilizes supplemental software programs installed via the consumer deployment source is notified that their enterprise is disabling access to the consumer deployment source and moving to a centralized deployment source, the user can continue using their current applications without any interruptions or noticeable changes. In this manner, the user 118 may not be required to perform any additional actions for using a desired application, thus making the transition seamless and unnoticeable to the user 118.

When application 114 is offered by both deployment sources 122 and 132, it may be possible for the user 118 to install two distinct copies of the application on the client device 110. To prevent user confusion and conserve computing resources, the deployment engine 116 may determine when multiple copies of the same application are available on the client device 110, as described below with regards to FIG. 2, and remove and/or ignore all but one of the copies. This may be performed in a manner such that all existing settings and data are preserved such that the user 118 is not required to perform additional tasks for utilizing the application.

Figure 2:
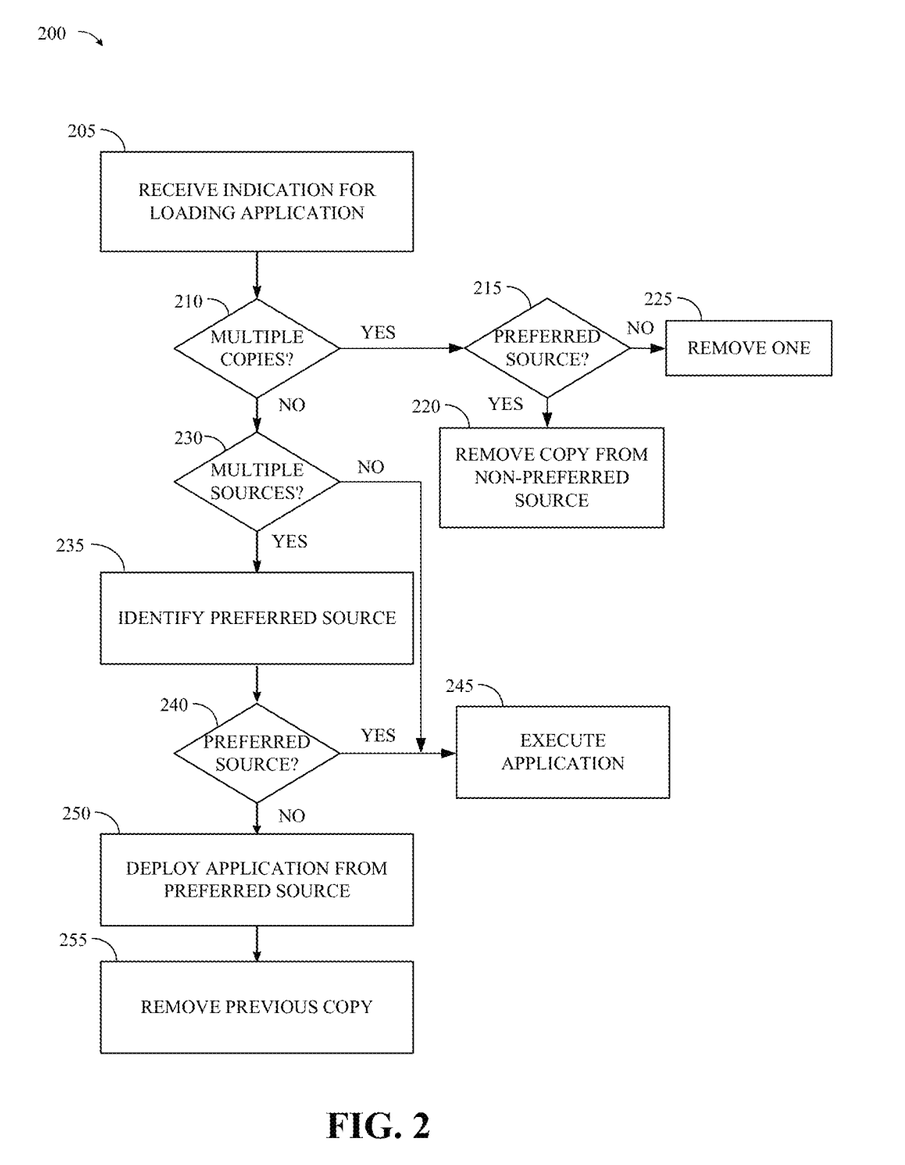
FIG. 2 is a flow diagram showing an example of a method for deployment of applications offered by multiple deployment sources.

FIG. 2 is a flow diagram depicting an exemplary method 200 for deployment of applications offered by multiple deployment sources. In an example, one or more steps of method 200 may be performed by an operating system (e.g., operating system 112 of FIG. 1), a deployment engine (e.g., deployment engine 116 of FIG. 1) and/or a deployment server (e.g., deployment server 120 or 130 of FIG. 1).

At 205, method 200 may begin by receiving an indication for loading an application on a client device. The indication may be received when a user invokes a user interface element for initiating an application or when a document associated with an application is opened. In an example, this occurs when a document which includes features enabled by a supplemental software program is opened. In some implementations, one or more steps of method 200 may be performed upon initialization and/or refreshing of an applications list (e.g., refreshing of add-in list). In such implementations and/or after a new application is downloaded and a list of entitlements is created or updated, method 200 may examine each of the entitlements for the provider and check to see if duplicates exist. In an implementation where preference is given to a deployment source (e.g., enterprise deployment source) and the preferred deployment source is refreshed after initialization of the non-preferred deployment source, the non-preferred deployment source may need to be refreshed as well so that its internal list of applications can be updated based on what the preferred deployment source has. In some implementations, these steps are performed by calling a RefreshExtensionList function.

When it is determined that an application (or supplemental software program) is being loaded on a client device, method 200 may proceed to determine if more than one copy of the same application is available on the client device, at 210. This may be performed by searching for the application ID to determine if another application having the same application ID as the invoked application exists on the client device. In some implementations, applications are identified by a combination of their application ID and a designation identifying the deployment source from which they were deployed. The combination of application ID and the designation identifying the deployment source may be referred to as an asset ID. In these implementations, to determine if multiple copies of the same application exist on the device, only the application ID may be examined.

When it is determined that multiple copies of the application are available on the client device (or a copy that is different from the copy invoked is available on the client device), method 200 may proceed to determine if the client device is associated with a preferred deployment source, at 215. For example, method 200 may determine if the device is associated with an enterprise indicating a preference for a specific deployment source (e.g., enterprise deployment source). This may be achieved by examining a setting associated with the client device.

Alternatively, this may be determined by examining a number of parameters to determine if the client device should be associated with a preferred deployment source. For example, a determination may made as to whether the client device is associated with a consumer or an enterprise client device and based on this information, determine which deployment source is the preferred deployment source for the client device. In another example, it may be determined if a user account associated with one of the deployment sources exist and if so, select that deployment source as the preferred deployment source. Other mechanisms for identifying the preferred deployment source may also be utilized.

When it is determined that the client device is associated with a preferred source (yes at 215), method 200 may proceed to remove and/or ignore the copy of the application that was deployed from the non-preferred deployment source, at 220. If it is determined, however, that the client device is not associated with a preferred deployment source and/or a preferred deployment source can be assigned to the client device (no at 215), method 200 may proceed to remove one of the application copies from the client device, at 225. Removing a copy of the application may involve removing data associated with the extra copy from the client device. The data may include executable code, user interface elements associated with the additional copies, and any other information or data relating to the additional copy. While removing the additional copy, care may be taken to ensure documents associated with the removed application have access to the remaining copy of the application such that all existing documents and applications continue to function in the same manner as before. Ignoring a copy of the application may involve designating that copy as a non-preferred copy and removing user interface elements associated with the copy from user interface screens.

In implementations where the enterprise deployment source is the preferred deployment source, ensuring that multiple copies of an application do not exist on the same device may be achieved by invoking the consumer deployment source to determine if there is an equivalent application in the enterprise deployment source and if so, not adding the application to its list of entitlements for the user.

In some implementations, when preference is given to one type of deployment source, but access is still available to other deployment sources, the user may be able to install applications from the non-preferred deployment sources and those applications may be kept on the user's device but not be projected (e.g., icons representing them are not displayed). This implementation may be advantageous when the user has different user profiles and each profile has a different preferred deployment source (e.g., personal user profile vs. work user profile). For example, when the user logs into the different user profile, access to the non-preferred sourced application may be granted.

When it is determined, at step 210, that multiple copies of the invoked application do not exist on the client device (no at 210), method 200 may proceed to determine if the invoked application is offered from multiple deployment sources accessible to the client device, at 230. This may involve determining which deployment sources are available and/or accessible to the client device and/or user of the client device (e.g., by examining user accounts associated with the deployment sources) and accessing those deployment sources to determine if the invoked application is offered by more than one of the available deployment sources. In some implementations, this process simply involves examining the source of the invoked application and determining if the application is available from a different source accessible to the user. The process of determining if the application is offered from multiple sources may include examining many parameters associated with the application. This may require accessing metadata (e.g., from a manifest file) associated with the application and may involve initializing the deployment source from which the application is provided and/or loading the manifest associated with the application in memory.

In some implementations, this process involves calling a function referred to as GetManifestFromBetterProvider that provides for switching the application to one provided from a preferred source if it exists, before performing any other operations. In some implementations, the function is invoked by an extension manager (e.g., Office Extension Manager). This may involve examining an application and looking for one from a different provider. The process may provide two ways in which an answer may be returned: (1) caller provides a callback; and (2) caller passes in a reference it expects to be populated with the answer. In some implementations, for applications that are provided by the consumer deployment source, the consumer deployment source is initialized and then the enterprise deployment source is checked to see if the application is available from the enterprise deployment source.

In situations where the invoked application is determined to be offered by more than deployment source (yes at 230), method 200 may proceed to identify the preferred deployment source for the client device and/or the invoked application, at 235. In an example, this may involve determining if the invoked application was provided from a consumer deployment source, determining if the client device is associated with an enterprise and if so, selecting the enterprise deployment source as the preferred source. For a device associated with an enterprise, the process may involve determining if the application is available from an enterprise deployment source, and if not, selecting the consumer deployment source as the preferred source.

Once the preferred deployment source has been identified, method 200 may proceed to determine, if the invoked application was provided by the preferred deployment source, at 240. This may include examining the manifest and/or an asset ID associated with the invoked application to identify its deployment source. When it is determined that the identified deployment source is the preferred deployment source (yes at 240), method 200 may proceed to execute the application, at 245. Similarly, when it is determined, at 230, that the invoked application is not offered by multiple sources (no at 230), method 200 may proceed to execute the invoked application in a normal manner, at 245.

When, it is determined, however, that the source providing the invoked application is not the preferred source (no at 240), method 200 may proceed to deploy the application from the preferred deployment source, at 250, before moving to remove and/or ignore the previous copy of the application, at 255. The process of removing and/or ignoring the previous copy may include removing user interface elements (e.g., icons in the ribbon) associated with the previous copy of the application. Similarly, the process of deploying the application may include creating user interface elements associated with the newly deployed application to replace the user interface elements associated with the previous copy. Similar operations may be performed to correct shortcut resources associated with the invoked application, as needed. In some implementations, removing and/or ignoring the application simply entails removing the application from the list of applications provided by the provider and does not include removing the application from the user's list of entitlements (e.g., list of applications to which they are entitled). In this manner, if a user obtained an application as a personal user, they may still be able to use it when logged into their personal profile.

In some implementations, to ensure enterprise sources are given preference, after a consumer deployment source completes downloading and creating a list of entitlements (e.g., applications), each of the entitlements is examined to determine if an equivalent application exists in the enterprise deployment source and if so, remove the application from the device and download it from the enterprise deployment source.

Furthermore, in some implementations, an application may be provided with different functionalities depending on the deployment source. For example, when the user is associated with multiple profiles (e.g., personal profile and work profile), a second copy of an application may be installed for one of the profiles (e.g., work profile) using a deployment source associated with the profile (e.g., enterprise deployment source). The second copy may be deployed such that no data from the existing application is migrated into the second copy. This may be utilized in situations where the user brings their own device for use at work, and it may be undesirable to have an enterprise administrator inadvertently take over the user's personal data. However, in a situation, where the device belongs to the enterprise and the application is an internal line-of-business application that stores local data, the transition from one deployment source to another may be made seamlessly. For example, duplicated user interface elements (e.g., icons) may be eliminated, while existing user interface elements are retained in the same folders, and existing local settings are maintained.

Mechanisms disclosed herein may be applied to provide a seamless transition between production and early versions (e.g., beta version) of an application on the same device (e.g., where the beta version is offered by a different deployment source) and/or a seamless transition between different versions of applications that are offered for different subsidiaries of an enterprise (e.g., different deployment sources in different geographical regions).

In this manner, an architecture is provided which enables deployment of applications from preferred providers and facilitates for loading of the application correctly from the preferred provider such that the deployment source is seamless to the end user. This provides an improved user experience when more than one deployment source from which an application may be deployed is available. Furthermore, the mechanisms provided herein facilitate removal of duplicated entries on the user device, leading to reduced user confusion and increased customer satisfaction. The architecture may function on client devices that have access to multiple deployment sources and thus allows an identical application to be installed from multiple deployment sources. At runtime, the architecture may select the preferred deployment source to run the application from based on a set of defined rules and/or parameters. This results in a mechanism where to the end user, it may appear as if only one copy of the application is installed.

Figure 3:
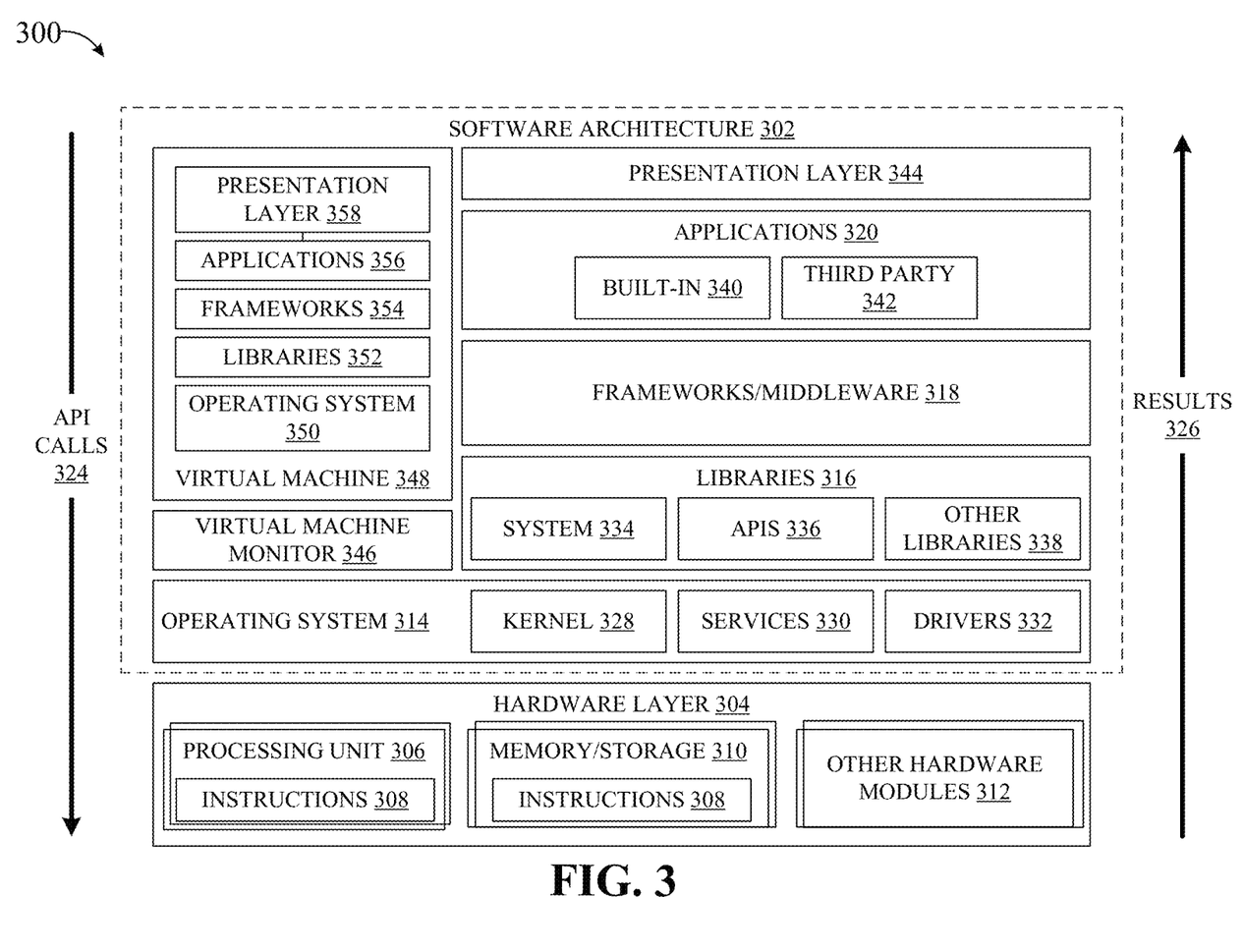
FIG. 3 is a block diagram illustrating an example of software architecture, various portions of which may be used in conjunction with various hardware architectures herein described.

FIG. 3 is a block diagram 300 illustrating an example software architecture 302, various portions of which may be used in conjunction with various hardware architectures herein described, which may implement any of the above-described features. FIG. 3 is a non-limiting example of a software architecture and it will be appreciated that many other architectures may be implemented to facilitate the functionality described herein. The software architecture 302 may execute on hardware such as client devices, native application provider, web servers, server clusters, external services, and other servers. A representative hardware layer 304 includes a processing unit 306 and associated executable instructions 308. The executable instructions 308 represent executable instructions of the software architecture 302, including implementation of the methods, modules and so forth described herein.

The hardware layer 304 also includes a memory/storage 310, which also includes the executable instructions 308 and accompanying data. The hardware layer 304 may also include other hardware modules 312. Instructions 308 held by processing unit 308 may be portions of instructions 308 held by the memory/storage 310.

The example software architecture 302 may be conceptualized as layers, each providing various functionality. For example, the software architecture 302 may include layers and components such as an operating system (OS) 314, libraries 316, frameworks 318, applications 320, and a presentation layer 324. Operationally, the applications 320 and/or other components within the layers may invoke API calls 324 to other layers and receive corresponding results 326. The layers illustrated are representative in nature and other software architectures may include additional or different layers. For example, some mobile or special purpose operating systems may not provide the frameworks/middleware 318.

The OS 314 may manage hardware resources and provide common services. The OS 314 may include, for example, a kernel 328, services 330, and drivers 332. The kernel 328 may act as an abstraction layer between the hardware layer 304 and other software layers. For example, the kernel 328 may be responsible for memory management, processor management (for example, scheduling), component management, networking, security settings, and so on. The services 330 may provide other common services for the other software layers. The drivers 332 may be responsible for controlling or interfacing with the underlying hardware layer 304. For instance, the drivers 332 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 316 may provide a common infrastructure that may be used by the applications 320 and/or other components and/or layers. The libraries 316 typically provide functionality for use by other software modules to perform tasks, rather than rather than interacting directly with the OS 314. The libraries 316 may include system libraries 334 (for example, C standard library) that may provide functions such as memory allocation, string manipulation, file operations. In addition, the libraries 316 may include API libraries 336 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 316 may also include a wide variety of other libraries 338 to provide many functions for applications 320 and other software modules.

The frameworks 318 (also sometimes referred to as middleware) provide a higher-level common infrastructure that may be used by the applications 320 and/or other software modules. For example, the frameworks 318 may provide various GUI functions, high-level resource management, or high-level location services. The frameworks 318 may provide a broad spectrum of other APIs for applications 320 and/or other software modules.

The applications 320 include built-in applications 340 and/or third-party applications 342. Examples of built-in applications 340 may include, but are not limited to, a contacts application, a browser application, a location application, a media application, a messaging application, and/or a game application. Third-party applications 342 may include any applications developed by an entity other than the vendor of the particular system. The applications 320 may use functions available via OS 314, libraries 316, frameworks 318, and presentation layer 344 to create user interfaces to interact with users.

Some software architectures use virtual machines, as illustrated by a virtual machine 328. The virtual machine 328 provides an execution environment where applications/modules can execute as if they were executing on a hardware machine (such as the machine 400 of FIG. 4, for example). The virtual machine 348 may be hosted by a host OS (for example, OS 314) or hypervisor, and may have a virtual machine monitor 346 which manages operation of the virtual machine 348 and interoperation with the host operating system. A software architecture, which may be different from software architecture 302 outside of the virtual machine, executes within the virtual machine 348 such as an OS 350, libraries 352, frameworks 354, applications 356, and/or a presentation layer 358.

Figure 4:
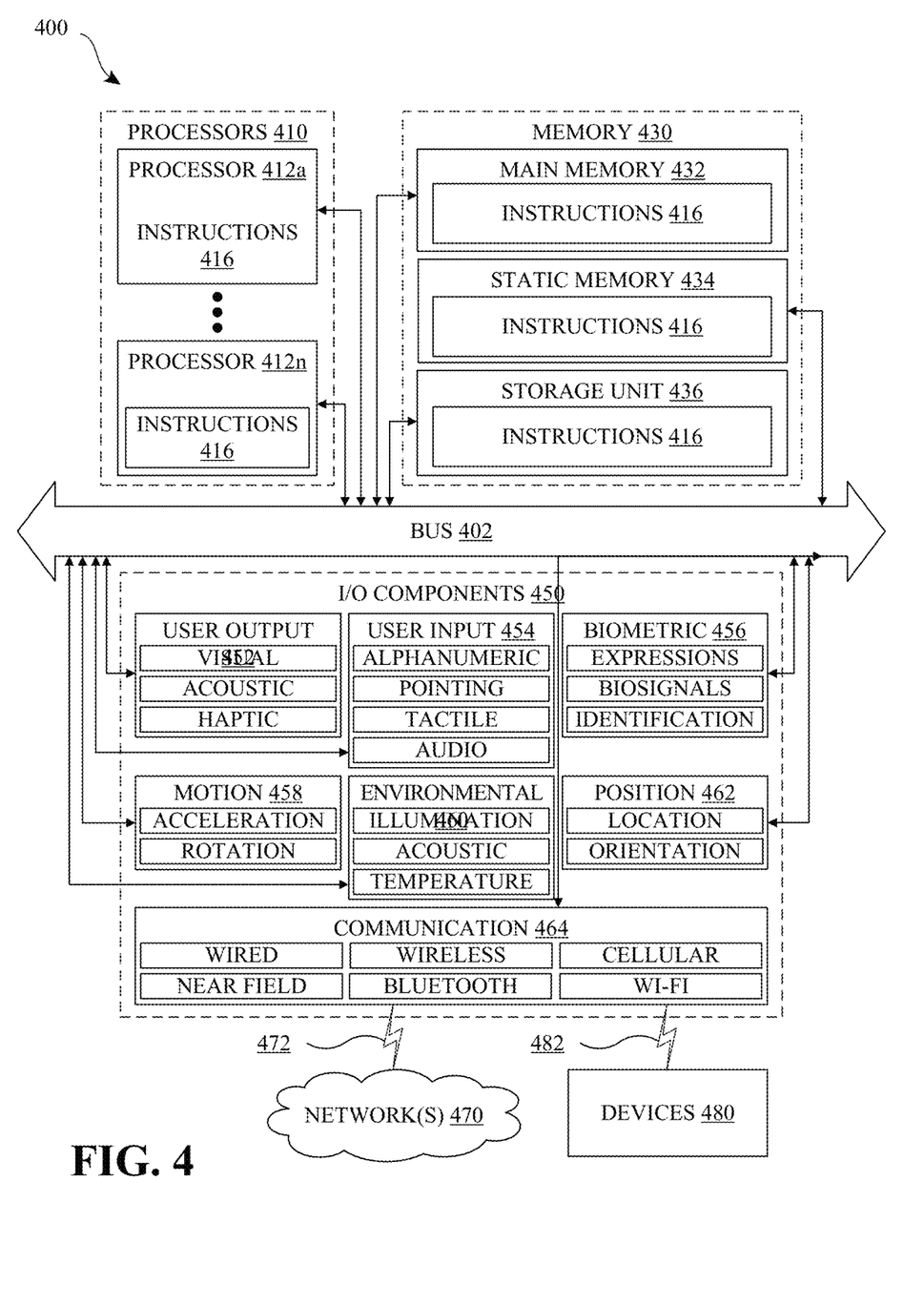
FIG. 4 is a block diagram illustrating components of an example of a machine configured to read instructions from a machine-readable medium and perform any of the features described herein.

FIG. 4 is a block diagram illustrating components of an example machine 400 configured to read instructions from a machine-readable medium (for example, a machine-readable storage medium) and perform any of the features described herein. The example machine 400 is in a form of a computer system, within which instructions 416 (for example, in the form of software components) for causing the machine 400 to perform any of the features described herein may be executed. As such, the instructions 416 may be used to implement methods or components described herein. The instructions 416 cause unprogrammed and/or unconfigured machine 400 to operate as a particular machine configured to carry out the described features. The machine 400 may be configured to operate as a standalone device or may be coupled (for example, networked) to other machines. In a networked deployment, the machine 400 may operate in the capacity of a server machine or a client machine in a server-client network environment, or as a node in a peer-to-peer or distributed network environment. Machine 400 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 400 is illustrated, the term "machine" includes a collection of machines that individually or jointly execute the instructions 416.

The machine 400 may include processors 410, memory 430, and I/O components 450, which may be communicatively coupled via, for example, a bus 402. The bus 402 may include multiple buses coupling various elements of machine 400 via various bus technologies and protocols. In an example, the processors 410 (including, for example, a central processing unit (CPU), a graphics processing unit (GPU), a digital signal processor (DSP), an ASIC, or a suitable combination thereof) may include one or more processors 412a to 412n that may execute the instructions 416 and process data. In some examples, one or more processors 410 may execute instructions provided or identified by one or more other processors 410. The term "processor" includes a multi-core processor including cores that may execute instructions contemporaneously. Although FIG. 4 shows multiple processors, the machine 400 may include a single processor with a single core, a single processor with multiple cores (for example, a multi-core processor), multiple processors each with a single core, multiple processors each with multiple cores, or any combination thereof. In some examples, the machine 400 may include multiple processors distributed among multiple machines.

The memory/storage 430 may include a main memory 432, a static memory 434, or other memory, and a storage unit 436, both accessible to the processors 410 such as via the bus 402. The storage unit 436 and memory 432, 434 store instructions 416 embodying any one or more of the functions described herein. The memory/storage 430 may also store temporary, intermediate, and/or long-term data for processors 410. The instructions 414 may also reside, completely or partially, within the memory 432, 434, within the storage unit 436, within at least one of the processors 410 (for example, within a command buffer or cache memory), within memory at least one of I/O components 450, or any suitable combination thereof, during execution thereof. Accordingly, the memory 432, 434, the storage unit 436, memory in processors 410, and memory in I/O components 450 are examples of machine-readable media.

As used herein, "machine-readable medium" refers to a device able to temporarily or permanently store instructions and data that cause machine 400 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 416) for execution by a machine 400 such that the instructions, when executed by one or more processors 410 of the machine 400, cause the machine 400 to perform and one or more of the features described herein. Accordingly, a "machine-readable medium" may refer to a single storage device, as well as "cloud-based" storage systems or storage networks that include multiple storage apparatus or devices.

The I/O components 450 may include a wide variety of hardware components adapted to receive input, provide output, produce output, transmit information, exchange information, capture measurements, and so on. The specific I/O components 450 included in a particular machine will depend on the type and/or function of the machine. For example, mobile devices such as mobile phones may include a touch input device, whereas a headless server or IoT device may not include such a touch input device. The particular examples of I/O components illustrated in FIG. 4 are in no way limiting, and other types of components may be included in machine 400. The grouping of I/O components 450 are merely for simplifying this discussion, and the grouping is in no way limiting. In various examples, the I/O components 450 may include user output components 452 and user input components 454. User output components 452 may include, for example, display components for displaying information (for example, a liquid crystal display (LCD) or a projector), acoustic components (for example, speakers), haptic components (for example, a vibratory motor or force-feedback device), and/or other signal generators. User input components 454 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 450 may include biometric components 456, motion components 458, environmental components 460 and/or position components 462, among a wide array of other environmental sensor components. The biometric components 456 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 462 may include, for example, location sensors (for example, a Global Position System (GPS) receiver), altitude sensors (for example, an air pressure sensor from which altitude may be derived), and/or orientation sensors (for example, magnetometers). The motion components 458 may include, for example, motion sensors such as acceleration and rotation sensors. The environmental components 460 may include, for example, illumination sensors, acoustic sensors and/or temperature sensors.

The I/O components 450 may include communication components 464, implementing a wide variety of technologies operable to couple the machine 400 to network(s) 470 and/or device(s) 480 via respective communicative couplings 472 and 482. The communication components 464 may include one or more network interface components or other suitable devices to interface with the network(s) 470. The communication components 464 may include, for example, components adapted to provide wired communication, wireless communication, cellular communication, Near Field Communication (NFC), Bluetooth communication, Wi-Fi, and/or communication via other modalities. The device(s) 480 may include other machines or various peripheral devices (for example, coupled via USB).

In some examples, the communication components 464 may detect identifiers or include components adapted to detect identifiers. For example, the communication components 464 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 462, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-4) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A device comprising:
a processor; and
a memory in communication with the processor, the memory comprising executable instructions that, when executed by the processor, cause the device to perform functions of:
  determining if an application is available for deployment to the device from a plurality of deployment sources,
  upon determining that the application is available for deployment from the plurality of deployment sources, identifying one of the plurality of deployment sources as a preferred deployment source for deploying the application; and
  deploying the application from the preferred deployment source to the device, wherein deploying the application includes at least one of installing the application, loading one or more user interface elements associated with the application and activating the application.

Item 2. The device of item 1, wherein the executable instructions when executed by the processor, further cause the device to perform functions of:
  determining if more than one copy of the application is available on the device,
  upon determining more than one copy of the application is available on the device, identifying the preferred deployment source for the application, and
  performing one of removing a copy of the application that is not associated with the preferred deployment source or ignoring the copy of the application that is not associated with the preferred deployment source.

Item 3. The device of item 2, wherein removing the copy of the application that is not associated with the preferred deployment source includes at least one of removing user interface elements associated with the copy of the application or removing the application from a list of applications provided by a non-preferred deployment source.

Item 4. The device of any of the preceding items, wherein the plurality of deployment sources includes a consumer deployment source and an enterprise deployment source.

Item 5. The device of any of the preceding items, wherein the application includes a supplemental software program.

Item 6. The device of any of the preceding items, wherein the executable instructions when executed by the processor, further cause the device to perform functions of:
  determining if a copy of the application available on the device was deployed from the preferred deployment source; and
  upon determining that the copy of the application available on the device was not deployed from the preferred deployment source, removing or ignoring the copy available on the device.

Item 7. The device of item 6, wherein removing the copy available on the device and deploying the application from the preferred deployment source includes maintaining at least one of user interface elements and one or more settings associated with the copy available on the device.

Item 8. A method for deploying an application from a deployment source to a device, comprising:
  determining if the application is available for deployment to the device from a plurality of deployment sources,
  upon determining that the application is available for deployment from the plurality of deployment sources, identifying one of the plurality of deployment sources as a preferred deployment source for deploying the application; and deploying the application from the preferred deployment source to the device,
  wherein deploying the application includes at least one of installing the application, loading one or more user interface elements associated with the application and activating the application.

Item 9. The method of item 8, further comprising:
  determining if more than one copy of the application is available on the device,
  upon determining more than one copy of the application is available on the device, identifying the preferred deployment source for the application, and
  performing one of removing a copy of the application that is not associated with the preferred deployment source or ignoring the copy of the application that is not associated with the preferred deployment source.

Item 10. The method of item 9, wherein removing the copy of the application that is not associated with the preferred deployment source includes removing user interface elements associated with the copy of the application.

Item 11. The method of any of items 8-10, wherein the plurality of deployment sources includes a consumer deployment source and an enterprise deployment source.

Item 12. The method of any of items 8-11, further comprising:
  determining if a copy of the application available on the device was deployed from the preferred deployment source; and
  upon determining that the copy of the application available on the device was not deployed from the preferred deployment source, removing or ignoring the copy available on the device.

Item 13. The method of item 12, wherein removing the copy available on the device and deploying the application from the preferred deployment source includes maintaining at least one of user interface elements and one or more settings associated with the copy available on the device.

Item 14. A non-transitory computer readable medium on which are stored instructions that, when executed, cause a programmable device to:
  determining if an application is available for deployment to the device from a plurality of deployment sources,
  upon determining that the application is available for deployment from the plurality of deployment sources, identifying one of the plurality of deployment sources as a preferred deployment source for deploying the application; and
  deploying the application from the preferred deployment source to the device,
  wherein deploying the application includes at least one of installing the application, loading one or more user interface elements associated with the application and activating the application.

Item 15. The non-transitory computer readable medium of item 14, wherein the instructions when executed, further cause the programmable device to:
  determine if more than one copy of the application is available on the device,
  upon determining more than one copy of the application is available on the device, identify the preferred deployment source for the application, and perform one of removing a copy of the application that is not associated with the preferred deployment source or ignoring the copy of the application that is not associated with the preferred deployment source.

Item 16, The non-transitory computer readable medium of item 15, wherein removing the copy of the application that is not associated with the preferred deployment source includes removing user interface elements associated with the copy of the application.

Item 17. The non-transitory computer readable medium of any of items 14-16, wherein the plurality of deployment sources includes a consumer deployment source and an enterprise deployment source.

Item 18. The non-transitory computer readable medium of any of items 14-17, wherein the instructions when executed, further cause the programmable device to:
 determine if a copy of the application available on the device was deployed from the preferred deployment source; and
 upon determining that the copy of the application available on the device was not deployed from the preferred deployment source, remove or ignore the copy available on the device.

Item 19. The non-transitory computer readable medium of item 18, wherein removing the copy available on the device and deploying the application from the preferred deployment source includes maintaining at least one of user interface elements and one or more settings associated with the copy available on the device.

Item 20. The non-transitory computer readable medium of any of items 14-19, wherein the application includes a supplemental software program.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A device comprising:
 a processor; and
 a memory in communication with the processor, the memory comprising executable instructions that, when executed by the processor, cause the device to perform functions of:
  storing an application, including one of more settings and one or more user interface elements associated with the application, from a non-preferred application store of a plurality of application stores, wherein the application is associated with an asset identifier indicating the application store the application is deployed from;
  subsequent to the storing, receiving, by a deployment engine, a request for activating the application on the device;
  upon receiving the request, automatically determining and activating the application, wherein the determining and activating further comprises:
   determining, by the deployment engine in operation with an operating system, whether the application is available from a preferred application store of the plurality of application stores, wherein determining whether the application is available from a preferred application store comprises, the deployment engine in operation with the operating system performing:
    examining one or more parameters associated with the device to determine whether the device is associated with the preferred application store; and
    accessing the preferred application store to determine whether the application is offered by the preferred application store;

examining the asset identifier associated with the application to determine whether the application is associated with the preferred application store;

upon determining that the application is not associated with the preferred application store, calling a function that provides for switching the application from the non-preferred application store to the preferred application store;

based on the function, downloading, by the deployment engine in operation with the operating system, the application from the preferred application store; and upon downloading the application from the preferred application store, automatically activating the application, wherein automatically activating the application further comprises:

executing the application downloaded from the preferred application store;

determining that more than one instance of the application is available on the device; and upon determining more than one copy of the application is available on the device, automatically removing, by the deployment engine in operation with the operating system, the one or more user interface elements associated with the application that is associated with the non-preferred application store.

2. The device of claim 1, further comprising removing the instance of the application that is associated with the non-preferred application store by removing the application from a list of applications provided by the non-preferred application store.

3. The device of claim 1, wherein the plurality of application stores includes a consumer application store and an enterprise application store.

4. The device of claim 1, wherein the application includes a supplemental software program.

5. The device of claim 1, further comprising removing the instance of the application that is associated with the non-preferred application store and using the one or more settings with the application from the preferred application store.

6. The device of claim 1, wherein determining whether the application is available from the preferred application store of the plurality of application stores includes automatically identifying, at runtime, without user input, one of the plurality of application stores as the preferred application store.

7. A method for deploying an application from an application store to a device, comprising:

storing an application, including one or more settings and one or more user interface elements associated with the application, from a non-preferred application store of a plurality of application stores, wherein the application is associated with an asset identifier indicating the application store the application is deployed from;

subsequent to the storing, receiving, by a deployment engine, a request for activating the application on the device;

upon receiving the request, automatically determining and activating the application, wherein the determining and activating further comprises:

determining, by the deployment engine in operation with an operating system, whether the application is available from a preferred application store of the plurality of application stores, wherein determining whether the application is available from a preferred application store comprises, the deployment engine in operation with the operating system performing:

examining one or more parameters associated with the device to determine whether the device is associated with the preferred application store; and accessing the preferred application store to determine whether the application is offered by the preferred application store;

examining the asset identifier associated with the application to determine whether the application is associated with the preferred application store;

upon determining that the application is not associated with the preferred application store, calling a function that provides for switching the application from the non- preferred application store to the preferred application store;

based on the function, downloading, by the deployment engine in operation with the operating system, the application from the preferred application store; and upon downloading the application from the preferred application store, automatically activating the application, wherein automatically activating the application further comprises:

executing the application downloaded from the preferred application store;

determining that more than one instance of the application is available on the device; and upon determining more than one copy of the application is available on the device, automatically removing, by the deployment engine in operation with the operating system, the one or more user interface elements associated with the application that is associated with the non-preferred application store.

8. The method of claim 7, further comprising removing the instance of the application that is associated with the non-preferred application store and removing the application from a list of applications provided by the non-preferred application store.

9. The method of claim 7, wherein the plurality of application stores includes a consumer application store and an enterprise application store.

10. The method of claim 7, further comprising removing the instance of the application that is associated with the non-preferred application store and using the one or more settings associated with the application from the preferred application store.

11. A non-transitory computer readable medium on which are stored instructions that, when executed, cause a programmable device to perform functions of:

storing an application, including one or more settings and one or more user interface elements associated with the application, from a non-preferred application store of a plurality of application stores, wherein the application is associated with an asset identifier indicating the application store the application is deployed from;

subsequent to storing, receiving, by a deployment engine, a request for activating the application on a device;

upon receiving the request, automatically determining and activating the application, wherein the determining and activating further comprises:

determining by the deployment engine in operation with an operating system, whether the application is available from a preferred application store of the plurality of application stores, wherein determining whether the application is available from a preferred application store comprises, the deployment engine in operation with the operating system performing:

examining one or more parameters associated with the device to determine whether the device is associated with the preferred application store; and accessing the preferred application store to determine whether the application is offered by the preferred application store;

examining the asset identifier associated with the application to determine whether the application is associated with the preferred application store;

upon determining that the application is not associated with the preferred application store, calling a function that provides for switching the application from the non-preferred application store to the preferred application store;

based on the function, downloading, by the deployment engine in operation with the operating system, the application from the preferred application store; and     upon downloading the application from the preferred application store automatically activating the application, wherein automatically activating the application further comprises:

executing the application downloaded from the preferred application store;

determining that more than one instance of the application is available on the device; and         upon determining more than one copy of the application is available on the device, automatically removing, by the deployment engine in operation with the operating system, the one or more user interface elements associated with the application that is associated with the non-preferred application store.

12. The non-transitory computer readable medium of claim 11, further comprising removing the instance of the application that is associated with the non-preferred application store and removing the application from a list of applications provided by the non-preferred application store.

13. The non-transitory computer readable medium of claim 11, wherein the plurality of application stores includes a consumer application store and an enterprise application store.

14. The non-transitory computer readable medium of claim 11, further comprising removing the instance of the application that is associated with the non-preferred application store and using the one or more settings with the application from the preferred application store.

15. The non-transitory computer readable medium of claim 11, wherein the application includes a supplemental software program.

* * * * *